US012658442B2

(12) United States Patent (10) Patent No.: US 12,658,442 B2
Lee et al. (45) Date of Patent: Jun. 16, 2026

(54) ANODE ACTIVE MATERIAL FOR LITHIUM SECONDARY BATTERY AND METHOD OF MANUFACTURING SAME

(71) Applicants: POSCO Holdings Inc., Seoul (KR);
RESEARCH INSTITUTE OF INDUSTRIAL SCIENCE & TECHNOLOGY, Pohang-si (KR);
POSCO FUTURE M CO., LTD., Pohang-si (KR)

(72) Inventors: Gang Ho Lee, Pohang-si (KR); Sei Min Park, Pohang-si (KR); Jung-Chul An, Pohang-si (KR); Jong Hoon Yoon, Pohang-si (KR); Hyun-Chul Jo, Pohang-si (KR)

(73) Assignees: POSCO Holdings Inc., Seoul (KR);
RESEARCH INSTITUTE OF INDUSTRIAL SCIENCE & TECHNOLOGY, Pohang-si (KR);
POSCO FUTURE CO., LTD., Pohang-si (KR)

( * ) Notice: Subject to any disclaimer, the term of this patent is extended or adjusted under 35 U.S.C. 154(b) by 796 days.

(21) Appl. No.: 17/787,788

(22) PCT Filed: Dec. 15, 2020

(86) PCT No.: PCT/KR2020/018377
§ 371 (c)(1),
(2) Date: Jun. 21, 2022

(87) PCT Pub. No.: WO2021/125755
PCT Pub. Date: Jun. 24, 2021

(65) Prior Publication Data
US 2023/0045738 A1 Feb. 9, 2023

(30) Foreign Application Priority Data
Dec. 20, 2019 (KR) ........................ 10-2019-0172233

(51) Int. Cl.
*H01M 4/583* (2010.01)
*H01M 4/04* (2006.01)
(Continued)

(52) U.S. Cl.
CPC ......... *H01M 4/583* (2013.01); *H01M 4/0471* (2013.01); *H01M 4/625* (2013.01);
(Continued)

(58) Field of Classification Search
CPC ..................................................... H01M 4/625
See application file for complete search history.

(56) References Cited

U.S. PATENT DOCUMENTS

2011/0195313 A1* 8/2011 Lee .......................... C01B 32/21
252/182.1
2020/0295351 A1* 9/2020 Piao .................. H01M 10/0525

FOREIGN PATENT DOCUMENTS

CN 102187498 A 9/2011
CN 104016333 A 9/2014
(Continued)

OTHER PUBLICATIONS

Machine translation of KR 20150134945 A from espacenet (Year: 2015).*
(Continued)

*Primary Examiner* — Nicholas A Smith
*Assistant Examiner* — Zackary Richard Cochenour
(74) *Attorney, Agent, or Firm* — Sughrue Mion, PLLC

(57) ABSTRACT

The present disclosure relates to a method of manufacturing an anode active material for a lithium secondary battery, the method including: mixing earth graphite and pitch coke with each other; preparing a raw material by adding and mixing a binder to the mixture; performing heat treatment on the raw material; graphitizing the heat-treated mixture to obtain a core part; immersing the core part in a hard carbon coating (Continued)

solution; and drying the coating solution in which the core part is immersed to obtain an anode active material.

8 Claims, 3 Drawing Sheets

(51) Int. Cl.
    *H01M 4/62*        (2006.01)
    *H01M 10/052*    (2010.01)
    *H01M 4/02*       (2006.01)

(52) U.S. Cl.
    CPC .... *H01M 10/052* (2013.01); *H01M 2004/021* (2013.01); *H01M 2004/027* (2013.01)

(56) References Cited

FOREIGN PATENT DOCUMENTS

| | | |
|---|---|---|
| CN | 104882590 A | 9/2015 |
| CN | 104953100 A | 9/2015 |
| CN | 105304870 A | 2/2016 |
| KR | 10-2010-0062719 A | 6/2010 |
| KR | 10-2010-0072160 A | 6/2010 |
| KR | 10-2013-0015967 A | 2/2013 |
| KR | 10-2015-0021406 A | 3/2015 |
| KR | 10-2016-0113981 A | 10/2016 |
| KR | 10-2017-0030580 A | 3/2017 |
| KR | 10-1790392 B1 | 10/2017 |
| KR | 10-1986680 B1 | 6/2019 |
| KR | 10-2019-0115834 A | 10/2019 |
| WO | 2014/133070 A1 | 9/2014 |
| WO | 2016/153255 A1 | 9/2016 |

OTHER PUBLICATIONS

Machine translation of JP 2016095897 A from espacenet (Year: 2016).*

Belkacem Amara, Duygu Kocaefe, Yasar Kocaefe, A review of the studies on the utilization of petroleum pitch and its blends with coal tar pitch for carbon anode production in aluminum industry, (https://www.sciencedirect.com/science/article/pii/S3050475925001216) (Year: 2025).*

Chinese Office Action dated May 31, 2023 in Chinese Application No. 202080088710.8.

Office Action issued Apr. 3, 2024 in Chinese Application No. 202080088710.8.

Written Opinion for PCT/KR2020/018377, dated Mar. 18, 2021.

International Search Report for PCT/KR2020/018377, dated Mar. 18, 2021.

Office Action issued Jul. 18, 2024 in Chinese Application No. 202080088710.8.

* cited by examiner

ANODE ACTIVE MATERIAL FOR LITHIUM SECONDARY BATTERY AND METHOD OF MANUFACTURING SAME

CROSS REFERENCE TO RELATED APPLICATIONS

This application is a National Stage of International Application No. PCT/KR2020/018377 filed Dec. 15, 2020, claiming priority based on Korean Patent Application No. 10-2019-0172233 filed Dec. 20, 2019, the entire disclosures of which are incorporated herein by reference.

TECHNICAL FIELD

The present disclosure relates to an anode active material for a lithium secondary battery and a method of manufacturing the same. Specifically, the present disclosure relates to an anode active material for a lithium secondary battery that has improved performance through structural stabilization, and a method of manufacturing the same.

BACKGROUND ART

Since a graphite/carbon-based anode active material used as an anode of a lithium secondary battery has a potential close to an electrode potential of a lithium metal, a small change in crystal structure during intercalation and deintercalation processes of lithium ions enables continuous and repeated redox reactions to proceed in an electrode, which provides a basis for the lithium secondary battery to exhibit a high capacity and an excellent lifespan.

As the carbon-based anode active material, various types of materials such as natural graphite and artificial graphite, which are crystalline carbon-based materials, and hard carbon and soft carbon, which are amorphous carbon-based materials, have been used. Among them, a graphite-based active material that may improve lifespan characteristics of the lithium secondary battery because it has excellent reversibility has been the most widely used. The graphite-based active material has a low discharge voltage of −0.2 V compared to lithium, such that a battery using the graphite-based active material may have a high discharge voltage of 3.6 V. Therefore, the graphite-based active material provides many advantages in terms of an energy density of the lithium secondary battery.

Artificial graphite, which is a crystalline carbon-based material, has a more stable crystal structure than natural graphite because it forms a crystal structure of graphite by applying high heat energy of 2,700° C. or higher, such that a change in crystal structure is small even after repeated charging and discharging of lithium ions, and thus, the artificial graphite has a relatively long lifespan. In general, the artificial graphite-based anode active material has a lifespan of 2 to 3 times longer than that of natural graphite.

Soft carbon and hard carbon, which are amorphous carbon-based materials in which a crystal structure is not stabilized, have more smooth intercalation and deintercalation of lithium ions. Therefore, the soft carbon and hard carbon may implement an increase in charge and discharge rate, and may thus be used for an electrode requiring high-speed charging. In general, the carbon-based materials are mixed with each other in a certain ratio and used in consideration of lifespan characteristics and output characteristics of a lithium secondary battery to be used.

Meanwhile, improving high-temperature performance (high-temperature storage characteristics and high-temperature cycle characteristics) of the lithium secondary battery is an important object. When the total internal pore volume is high after the anode active material is applied to a current collector and rolled, high-temperature performance of an anode is likely to be deteriorated. Therefore, it is required to improve high-temperature characteristics of the lithium secondary battery by minimizing changes in structure and total internal pore volume of the electrode that occur during rolling of the electrode. In particular, when developing an anode material for a secondary battery for rapid-charging, an improvement of high-temperature characteristics is further required.

In accordance with increases in technology development and demand for mobile devices, a demand for a secondary battery as an energy source has rapidly increased. Among these secondary batteries, lithium secondary batteries that exhibit high energy density and operating potential and have a long cycle lifespan and a low self-discharge rate have been commercialized and widely used.

In addition, in accordance with an increase in interest in environmental issues, an interest in electric vehicles and hybrid electric vehicles that may replace vehicles using fossil fuels, such as gasoline vehicles and diesel vehicles, which are one of the main causes of air pollution, has increased. Studies for using a lithium secondary battery as a power source for such electric vehicles and hybrid electric vehicles have been actively conducted.

In general, the lithium secondary battery includes a cathode including a cathode active material, an anode including an anode active material, a separator, and an electrolyte, and is a secondary battery in which charging and discharging are performed by intercalation and deintercalation of lithium ions. The lithium secondary battery has advantages of a high energy density, a high electromotive force, and a high capacity, and thus has been applied to various fields.

A metal oxide such as $LiCoO_2$, $LiMnO_2$, $LiMn_2O_4$, or $LiCrO_2$ has been used as the cathode active material constituting the cathode of the lithium secondary battery, and a carbon-based material such as metal lithium, graphite, or activated carbon, oxide silicon (SiOx), or the like has been used as the anode active material constituting the anode of the lithium secondary battery. Among the anode active materials, metal lithium has been mainly used in the early stage. However, as a charge and discharge cycle progresses, a phenomenon in which lithium atoms grow on a surface of the metal lithium and the grown lithium atoms damage the separator to cause damage of the battery occurs. Therefore, recently, the carbon-based material has been mainly used. The graphite-based material exhibits excellent capacity retention characteristics and efficiency, but is still somewhat insufficient to exhibit theoretical characteristics of a high energy and a high power density required by the relevant market in terms of a theoretical capacity value (for example, in a case of a $LiC_6$ anode, about 372 mAh/g).

In particular, due to a rapid rise of electric vehicles (EVs) in recent years, a demand for improving rapid-charging characteristics of the lithium-ion secondary battery while retaining the existing capacity has increased. The anode active material in charge of storage of lithium ions during charging plays a role in improving such rapid-charging and is mainly formed of a carbon/graphite-based material. Therefore, formation of a stable solid electrolyte interface (SEI) during charging is important.

However, in a case where an excessive performance improvement is applied to rapid-charging characteristics, a trade-off effect inevitably occurs, and thus, another issue to be solved inevitably arises due to reduction in discharge capacity and efficiency.

In addition, as the rise of EVs is facing a situation of oversupply mainly caused by China together with these technical issues, a situation under pressure from an overall price cut is developing. In addition, in the face of the Chinese government's annual subsidy cut policy and deterioration in profitability, above all, a breakthrough in price has been required.

Until now, in a case of a natural graphite-based anode material that is used as much as artificial graphite, flake graphite, which has the highest performance among the carbon/graphite anode materials, has been mainly used in terms of a discharge capacity, but there is an issue that the lifespan is reduced due to expansion characteristics. Therefore, there has been a demand from the industry for a development of an anode material using earth graphite that has relatively high price competitiveness although it has the same problems as described above, but there is a limitation because it is more amorphous and has a small particle size.

DISCLOSURE

Technical Problem

The present disclosure has been made in an effort to provide an anode active material that may improve three electrochemical properties of high discharge capacity/efficiency/output using earth graphite, which is a cheaper and low-grade raw material, and a method of manufacturing the same. The present disclosure has also been made in an effort to provide an anode active material having expansion characteristics by improving coating of an anode material.

Technical Solution

An anode active material for a lithium secondary battery of an exemplary embodiment of the present disclosure may include: a core part in which earth graphite and pitch coke are mixed with each other; and a hard carbon coating for coating the core part.

A mixing ratio of the earth graphite to the pitch coke may be 30:70 to 70:30.

A thickness of the hard carbon coating part may be 10 to 700 nm.

A degree of graphitization of the earth graphite may be 90% or more.

In a method of manufacturing the anode active material for a lithium secondary battery, a volume expansion rate at a 5C-rate after 50 cycles may be less than 20%.

The earth graphite may have a crystallite size La of 20 to 50 nm and a crystallite size Lc of 10 to 40 nm, when measured by X-ray diffraction (XRD).

An average particle size D50 of the anode active material for a lithium secondary battery may be 14 to 19 μm.

The anode active material for a lithium secondary battery may have a specific surface area (BET) of 0.9 to 1.3 m²/g.

The hard carbon may be one or more selected from the group consisting of a phenolic resin, a naphthalene resin, a furfuryl alcohol resin, a polyamide resin, a furan resin, a polyimide resin, an epoxy resin, a vinyl chloride resin, gum arabic, citric acid, stearic acid, sucrose, polyvinylidene fluoride, carboxymethyl cellulose (CMC), hydroxypropyl cellulose, regenerated cellulose, polyvinylpyrrolidone, tetrafluoroethylene, polyethylene, polypropylene, an ethylene propylene diene monomer (EPDM), a sulfonated EPDM, starch, polyacrylic acid, sodium polyacrylate, polyacrylonitrile, cellulose, styrene, polyvinyl alcohol, and polyvinyl chloride.

A method of manufacturing an anode active material for a lithium secondary battery of another exemplary embodiment of the present disclosure may include: mixing earth graphite and pitch coke with each other to prepare a mixture; preparing a raw material by adding and mixing a binder to the mixture; performing heat treatment on the raw material; graphitizing the heat-treated mixture to obtain a core part; immersing the core part in a hard carbon coating solution; and drying the coating solution in which the core part is immersed to obtain an anode active material.

In the mixing of the earth graphite and the pitch coke with each other, a mixing ratio of the earth graphite to the pitch coke may be 30:70 to 70:30.

In the immersing of the core part in the hard carbon coating solution, a hard carbon coating may be formed in an amount of 1 to 5 wt % with respect to a total weight of the core part.

In the preparing of the raw material by adding and mixing the binder to the mixture, during the mixing, coal-tar pitch may be further added in an amount of 10 wt % or less with respect to a total weight of the raw material.

In the mixing of the earth graphite and the pitch coke with each other, a degree of graphitization of the earth graphite may be 90% or more.

In the mixing of the earth graphite and the pitch coke with each other, the earth graphite may have a crystallite size La of 20 to 50 nm and a crystallite size Lc of 10 to 40 nm, when measured by X-ray diffraction (XRD).

In the immersing of the core part in the hard carbon coating solution, the hard carbon may be one or more selected from the group consisting of a phenolic resin, a naphthalene resin, a furfuryl alcohol resin, a polyamide resin, a furan resin, a polyimide resin, an epoxy resin, a vinyl chloride resin, gum arabic, citric acid, stearic acid, sucrose, polyvinylidene fluoride, carboxymethyl cellulose (CMC), hydroxypropyl cellulose, regenerated cellulose, polyvinylpyrrolidone, tetrafluoroethylene, polyethylene, polypropylene, an ethylene propylene diene monomer (EPDM), a sulfonated EPDM, starch, polyacrylic acid, sodium polyacrylate, polyacrylonitrile, cellulose, styrene, polyvinyl alcohol, and polyvinyl chloride.

Advantageous Effects

The anode active material of an exemplary embodiment of the present disclosure may provide an anode active material having improved performance by achieving structural stabilization of pitch coke having a high capacity and an excellent output by earth graphitization through the hard carbon coating.

In addition, according to an exemplary embodiment of the present disclosure, an economic effect such as cost reduction may be obtained by using a low-quality raw material.

MODE FOR INVENTION

Figure 1:
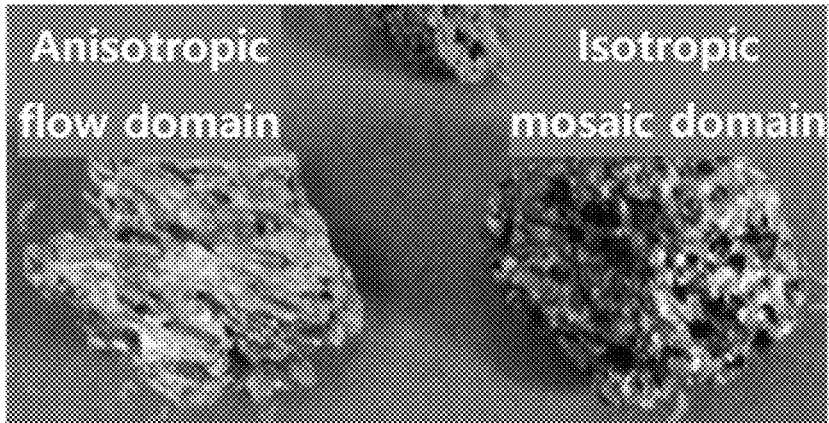
FIG. 1 illustrates pitch coke (isotropic mosaic domain) and needle coke (anisotropic flow domain).

The terms "first", "second", "third", and the like are used to describe various parts, components, regions, layers, and/ or sections, but are not limited thereto. These terms are only used to differentiate a specific part, component, region, layer, or section from another part, component, region, layer, or section. Accordingly, a first part, component, region, layer, or section which will be described hereinafter may be referred to as a second part, component, region, layer, or section without departing from the scope of the present invention.

Terminologies used herein are to mention only a specific exemplary embodiment, and are not to limit the present invention. Singular forms used herein include plural forms as long as phrases do not clearly indicate an opposite meaning. The term "comprising" used in the present specification concretely indicates specific properties, regions, integers, steps, operations, elements, and/or components, and is not to exclude the presence or addition of other specific properties, regions, integers, steps, operations, elements, and/or components.

When any part is positioned "on" or "above" another part, it means that the part may be directly on or above the other part or another part may be interposed therebetween. In contrast, when any part is positioned "directly on" another part, it means that there is no part interposed therebetween.

In addition, unless otherwise stated, % means wt %, and 1 ppm is 0.0001 wt %.

Unless defined otherwise, all terms including technical terms and scientific terms used herein have the same meanings as understood by those skilled in the art to which the present disclosure pertains. Terms defined in a generally used dictionary are additionally interpreted as having the meaning matched to the related technical document and the currently disclosed contents and are not interpreted as ideal or very formal meanings unless otherwise defined.

Hereinafter, exemplary embodiments of the present invention will be described in detail so that those skilled in the art to which the present invention pertains may easily practice the present invention. However, the present invention may be implemented in various different forms and is not limited to exemplary embodiments described herein.

The present disclosure is to provide an anode material composition capable of improving three electrochemical properties of high discharge capacity/efficiency/output using earth graphite, which is a low-grade raw material that is cheaper than flake graphite among natural graphites. In particular, in order to implement the unique discharge capacity characteristics of the earth graphite, it is intended to secure primary structural stability by using pitch coke, which is a low-quality raw material having strong random orientation, and finally to control expansion characteristics through a hard carbon coating. In particular, considering a small crystallite size of the earth graphite, it is intended to achieve excellent performance improvement.

Hereinafter, each step will be described in detail.

An anode active material for a lithium secondary battery of an exemplary embodiment of the present invention may include: a core part in which earth graphite and pitch coke are mixed with each other; and a hard carbon coating for coating the core part. Structural stability may be secured by applying pitch coke and a hard carbon coating to earth graphite.

A mixing ratio of the earth graphite to the pitch coke may be 30:70 to 70:30. When the mixing ratio of the earth graphite to the pitch coke is out of the above range, structural stability of the earth graphite through the pitch coke may be not secured, such that assembly is not possible, and thus, a tap density may be 0.6 g/cc or less, which is defective. Therefore, electrochemical properties such as a discharge capacity and efficiency may be deteriorated. This is due to differences in crystallinity and structure between the two materials, and the mixing ratio is appropriately in a range of 30:70 to 70:30 in which the two materials may complement each other to achieve a tap density of 0.8 g/cc or more.

A thickness of the hard carbon coating part may be 10 to 700 nm. Specifically, the thickness of the hard carbon coating part may be 300 to 500 nm. When the thickness is too small, a coverage of the anode material may be defective, which may cause occurrence of an uncoated region, and when the thickness is too large, the hard carbon coating part becomes thick, and an agglomeration phenomenon may occur in a partial region as well as simply thickening.

A degree of graphitization of the earth graphite may be 90% or more. When the degree of graphitization is too low, there is no carbon network layer spacing and crystallite growth, which may be disadvantageous to intercalation and deintercalation of lithium ions in the manufacturing of the anode material, and may cause a stuck phenomenon in some lithium ions.

In a method of manufacturing the anode active material for a lithium secondary battery, a volume expansion rate at a 5C-rate after 50 cycles may be less than 20%. Specifically, the volume expansion rate may be less than 15%. This is because the structural stability of the earth graphite is increased through the hard carbon coating.

The earth graphite may have a crystallite size La of 20 to 50 nm and a crystallite size Lc of 10 to 40 nm, when measured by X-ray diffraction (XRD).

An average particle size D50 of the anode active material for a lithium secondary battery may be 14 to 19 um. When a particle size of the anode active material is too small or large, it is disadvantageous to intercalation and deintercalation of lithium ions in the manufacturing of the anode material and causes a stuck phenomenon in some lithium ions, such that capacity and efficiency properties may be deteriorated.

The anode active material for a lithium secondary battery may have a specific surface area (BET) of 0.9 to 1.3 $m^2/g$. When the specific surface area is too large, an unnecessary reaction may be induced due to an increase in side reaction sites, which may cause deterioration of the performance of the anode material.

The hard carbon may be one or more selected from the group consisting of a phenolic resin, a naphthalene resin, a furfuryl alcohol resin, a polyamide resin, a furan resin, a polyimide resin, an epoxy resin, a vinyl chloride resin, gum arabic, citric acid, stearic acid, sucrose, polyvinylidene fluoride, carboxymethyl cellulose (CMC), hydroxypropyl cellulose, regenerated cellulose, polyvinylpyrrolidone, tetrafluoroethylene, polyethylene, polypropylene, an ethylene propylene diene monomer (EPDM), a sulfonated EPDM, starch, polyacrylic acid, sodium polyacrylate, polyacrylonitrile, cellulose, styrene, polyvinyl alcohol, and polyvinyl chloride.

A method of manufacturing an anode active material for a lithium secondary battery of an exemplary embodiment of the present disclosure may include: mixing earth graphite and pitch coke with each other; preparing a raw material by adding and mixing a binder to the mixture; performing heat treatment on the raw material; graphitizing the heat-treated mixture to obtain a core part; immersing the core part in a hard carbon coating solution; and drying the coating solution in which the core part is immersed to obtain an anode active material.

In the mixing of the earth graphite and the pitch coke with each other, a mixing ratio of the earth graphite to the pitch coke may be 30:70 to 70:30. When the mixing ratio of the earth graphite to the pitch coke is out of the above range, structural stability of the earth graphite through the pitch coke may be not secured, such that assembly is not possible, and thus, a tap density may be 0.6 g/cc or less, which is defective. Therefore, electrochemical properties such as a discharge capacity and efficiency may be deteriorated. This is due to differences in crystallinity and structure between the two materials, and the mixing ratio is appropriately in a range of 30:70 to 70:30 in which the two materials may complement each other to achieve a tap density of 0.8 g/cc or more.

In the immersing of the core part in the hard carbon coating solution, a hard carbon coating may be formed in an amount of 1 to 5 wt % with respect to a total weight of the core part. When the amount of the hard carbon coating is less than 1 wt %, a coverage of the anode material may be defective, which may cause occurrence of an uncoated region, and when the amount of the hard carbon coating exceeds 5 wt %, the hard carbon coating part becomes thick, and an agglomeration phenomenon may occur in a partial region as well as simply thickening.

In addition, a content of the coating solution may be controlled according to the type of the coating solution used. For example, in a case of a phenolic resin, since a coverage is excellent, a core material coverage is excellent even when only 1 wt % of the phenolic resin is added, but in a case of a furan resin, 3 wt % of the furan resin may be added.

In the preparing of the raw material by adding and mixing the binder to the mixture, during the mixing, coal-tar pitch may be further added in an amount of 10 wt % or less with respect to a total weight of the raw material. The coal-tar pitch is a material having viscoelasticity unlike powder pitch. The coal-tar pitch may be added to increase efficiency of kneading, and when the amount of coal-tar pitch added is too much, stuck may occur during the manufacturing process, and when the amount of coal-tar pitch added is too small, assembly efficiency may be reduced. Whether or not coke is added and the amount of coke added may be controlled depending on properties of coke to be added.

In the mixing of the earth graphite and the pitch coke with each other, a degree of graphitization of the earth graphite may be 90% or more. When the degree of graphitization is too low, there is no carbon network layer spacing and crystallite growth, which may be disadvantageous to intercalation and deintercalation of lithium ions in the manufacturing of the anode material, and may cause a stuck phenomenon in some lithium ions.

In the mixing of the earth graphite and the pitch coke with each other, the earth graphite may have a crystallite size La of 20 to 50 nm and a crystallite size Lc of 10 to 40 nm, when measured by X-ray diffraction (XRD).

In the immersing of the core part in the hard carbon coating solution, the hard carbon may be one or more selected from the group consisting of a phenolic resin, a naphthalene resin, a furfuryl alcohol resin, a polyamide resin, a furan resin, a polyimide resin, an epoxy resin, a vinyl chloride resin, gum arabic, citric acid, stearic acid, sucrose, polyvinylidene fluoride, carboxymethyl cellulose (CMC), hydroxypropyl cellulose, regenerated cellulose, polyvinylpyrrolidone, tetrafluoroethylene, polyethylene, polypropylene, an ethylene propylene diene monomer (EPDM), a sulfonated EPDM, starch, polyacrylic acid, sodium polyacrylate, polyacrylonitrile, cellulose, styrene, polyvinyl alcohol, and polyvinyl chloride.

Hereinafter, Examples of the present invention will be described in detail so that those skilled in the art to which the present invention pertains may easily practice the present invention. However, the present invention may be implemented in various different forms and is not limited to Examples described herein.

Evaluation of Performance of Core Part Before Coating

Manufacture of Core Part

Generally used flake graphite and earth graphite products, and pitch coke were used. The earth graphite was pulverized using a jet mill to have a particle size, a tap density, and a specific surface area similar to those of the flake graphite. Table 1 shows specifications of the used raw materials. A coefficient of thermal expansion (CTE) of the pith coke as coal-based calcined pitch coke was $40 \times 10^{-7}1°$ C.

TABLE 1

| Classification | Particle size | | | Tap density (g/cc) | BET (m²/g) |
| --- | --- | --- | --- | --- | --- |
| | D10 | D50 | D90 | | |
| Earth graphite | 3.00 | 5.10 | 13.10 | 0.51 | 2.89 |
| Flake graphite | 3.20 | 4.70 | 12.50 | 0.49 | 3.00 |
| Pitch coke | 7.32 | 8.93 | 19.83 | 0.58 | 1.85 |

The pitch coke (isotropic mosaic domain) has a porous structure and tends to have a random orientation in comparison to needle coke (anisotropic flow domain). The pitch coke has the effect of improving output, and is mixed with the earth graphite to make the structure dense.

Each of the earth graphite having the above specifications or artificial graphite was mixed with coal-based calcined pitch coke at the ratio shown in Table 2. A petroleum pitch binder having a softening point of 200° C. was added to the mixture in an amount of 20 wt % with respect to the total weight of the mixture, and mixing was performed at room temperature and a rotation speed of 30 rpm using a V-mixer for 1 hour, thereby preparing an anode raw material. The mixed raw material was added to a horizontal kneader, and heat treatment was performed at a speed of 45 rpm and 550° C. for a total of 5 hours. After 2 hours of the heat treatment, when the temperature reached 300° C., coal-tar was additionally added in an amount of 10 wt % with respect to the total weight of the raw material. Subsequently, when the temperature reached 550° C. and the kneading was completed, the raw material was rested for 1 hour. Subsequently, the kneaded raw material was naturally cooled for 1 hour.

Thereafter, graphitization was performed in an induction heating furnace at 3,000° C. for about 3 hours to manufacture a core part.

Manufacture of Anode 97 wt % of the manufactured core part as an anode material, 2 wt % of a binder containing carboxymethyl cellulose and styrene butadiene rubber, and 1 wt % of a carbon black conductive material were mixed in a distilled water solvent to prepare an anode active material slurry.

After the anode material slurry was applied to a copper (Cu) current collector, drying was performed at 100° C. for 10 minutes, and compression was performed in a roll press. Thereafter, vacuum drying was performed in a vacuum oven at 100° C. for 12 hours to manufacture an anode. After the vacuum drying, an electrode density of the anode was set to 1.5 to 1.7 g/cc.

Manufacture of Lithium Secondary Battery

The manufactured anode and a lithium (Li)-metal as a cathode were used, a solution obtained by dissolving 1 mol of a $LiPF_6$ solution in a mixed solvent in which ethylene carbonate (EC) and dimethyl carbonate (DMC) were mixed at a volume ratio of 1:1 was used as an electrolyte. A 2032 coin type half coin cell was manufactured by a common manufacturing method using the respective components.

Table 2 shows evaluation results of mixing ratios and properties and electrochemical properties of the anode material.

TABLE 2

| Anode material | Tap density (g/cc) | BET (m²/g) | Discharge capacity (mAh/g) | Efficiency (%) |
|---|---|---|---|---|
| Earth graphite:pitch coke = 20:80 | 0.5 | 2.8 | 342 | 93 |
| Earth graphite:pitch coke = 30:70 | 0.5 | 3.1 | 338 | 92 |
| Earth graphite:pitch coke = 70:30 | 0.6 | 4.7 | 325 | 90 |
| Earth graphite:pitch coke = 80:20 | 0.5 | 5.2 | 321 | 91 |
| Flake graphite:pitch coke = 20:80 | 0.7 | 2.9 | 347 | 92 |
| Flake graphite:pitch coke = 30:70 | 0.7 | 2.5 | 349 | 91 |
| Flake graphite:pitch coke = 70:30 | 0.8 | 4.1 | 351 | 93 |
| Flake graphite:pitch coke = 80:20 | 0.8 | 4.6 | 353 | 92 |

Generally, in the case of the anode material using earth graphite, the tap density was lower than that of the flake graphite based on the same ratio, and the BET was high, and thus, it was determined that the assembly was not performed properly. This is because a large amount of side reaction sites are randomly scattered, and it is determined that the random direction of pitch coke has a limitation in stably maintaining the structure. In addition, it could be appreciated that the performance was deteriorated also in the discharge capacity (third charge and discharge cycle) and efficiency (efficiency in the first cycle=discharge capacity/charge capacity).

Evaluation of Performance of Anode Active Material after Coating

The core part in which the materials were mixed at the ratio shown in Table 2 was coated with soft carbon (coal-based pitch) or hard carbon (furan resin), and electrochemical properties thereof were evaluated. The used coating materials, contents, coating layer thicknesses, and evaluation results of electrochemical properties are shown in Table 3.

The coating materials were applied at the ratios shown in Table 3. Coating of the soft carbon was performed by dry coating, and coating of the hard carbon was performed by wet coating. After the core part was subjected to coating, heat treatment was performed in a carbonization furnace at 1,200° C. for 1 hour.

Thereafter, an anode and a 2032 coin type lithium secondary half coin cell were manufactured using the manufactured anode active material as described above, and electrochemical properties thereof were evaluated.

The results of the electrochemical evaluation are shown in Table 3, and the particle size (D50) and the specific surface area are shown in Table 4.

TABLE 3

| Anode material | Coating material | Coating material content wt % | Coating layer thickness (nm) | Discharge capacity (mAh/g) | Efficiency (%) |
|---|---|---|---|---|---|
| Earth graphite:pitch coke = 30:70 | Soft carbon (coal-based pitch) | 3 | 1050 | 332 | 92 |
| Earth graphite:pitch coke = 70:30 | Soft carbon (coal-based pitch) | 3 | 890 | 299 | 90 |
| Flake graphite:pitch coke = 30:70 | Soft carbon (coal-based pitch) | 3 | 1070 | 345 | 91 |
| Flake graphite:pitch coke = 70:30 | Soft carbon (coal-based pitch) | 3 | 750 | 347 | 93 |
| Earth graphite:pitch coke = 30:70 | Furan resin | 3 | 280 | 345 | 92 |
| Earth graphite:pitch coke = 70:30 | Furan resin | 3 | 550 | 343 | 90 |
| Flake graphite:pitch coke = 30:70 | Furan resin | 3 | 400 | 347 | 91 |
| Flake graphite:pitch coke = 70:30 | Furan resin | 3 | 700 | 350 | 93 |

TABLE 4

| Anode material | Coating material | Coating material content wt % | D50 (um) | Specific surface area (m²/g) |
|---|---|---|---|---|
| Earth graphite:pitch coke = 20:80 | Soft carbon (coal-based pitch) | 3 | 8.9 | 1.5 |
| Earth graphite:pitch coke = 30:70 | Soft carbon (coal-based pitch) | 3 | 8.2 | 1.0 |
| Earth graphite:pitch coke = 70:30 | Soft carbon (coal-based pitch) | 3 | 6.2 | 1.1 |
| Earth graphite:pitch coke = 80:20 | Soft carbon (coal-based pitch) | 3 | 5.8 | 0.9 |
| Flake graphite:pitch coke = 20:80 | Soft carbon (coal-based pitch) | 3 | 8.1 | 1.6 |
| Flake graphite:pitch coke = 30:70 | Soft carbon (coal-based pitch) | 3 | 8.2 | 1.2 |
| Flake graphite:pitch coke = 70:30 | Soft carbon (coal-based pitch) | 3 | 5.6 | 1.0 |
| Flake graphite:pitch coke = 80:20 | Soft carbon (coal-based pitch) | 3 | 5.7 | 2.0 |
| Earth graphite:pitch coke = 20:80 | Furan resin | | 8.5 | 1.7 |
| Earth graphite:pitch coke = 30:70 | Furan resin | 3 | 8.2 | 1.3 |
| Earth graphite:pitch coke = 70:30 | Furan resin | 3 | 6.7 | 1.1 |
| Earth graphite:pitch coke = 80:20 | Furan resin | 3 | 5.8 | 1.4 |
| Flake graphite:pitch coke = 20:80 | Furan resin | 3 | 8.4 | 1.8 |
| Flake graphite:pitch coke = 30:70 | Furan resin | 3 | 8.0 | 1.2 |
| Flake graphite:pitch coke = 70:30 | Furan resin | 3 | 6.6 | 0.8 |
| Flake graphite:pitch coke = 80:20 | Furan resin | 3 | 5.4 | 1.5 |

A coating content was represented by a weight ratio with respect to the total weight of the anode material (core part).

The coating material was coated even in an amount of 1 wt % or less, but it was confirmed that in the case of the soft carbon coating, the coverage of the core part was defective, and in the case of the hard carbon coating, the performance was excellent in a coating content of 0.5 wt %, but lifespan characteristics were rapidly deteriorated. That is, as a result of measuring a capacity retention rate based on a 2C-rate, it could be observed that in the case where the hard carbon coating was performed in an amount of 0.5 wt %, the capacity retention rate was reduced to 70% immediately after 10 cycles. A similar result was obtained even in the case where the hard carbon coating was performed in an amount of 1 wt %.

As a result of capturing images with a transmission electron microscope (TEM), it could be appreciated that in the case of the furan resin, a thinner coating film was formed. It was confirmed that in the case of the soft carbon, the discharge capacity was reduced in both two samples, and in particular, it was observed that in the case of the earth graphite, the capacity was further reduced. As a result of performing coating using a furan resin, which was a kind of hard carbon, an increase in discharge capacity was observed, but in the case of the flake graphite, the discharge capacity was reduced. It seems that a relatively large crystallite size is based on structural heterogeneity.

Evaluation of Performance According to Hard Carbon Coating Type

Based on the results of Table 3, the electrochemical performance was evaluated using a phenolic resin as a precursor in order to confirm the lifespan characteristics of the hard carbon coating, that is, the expansion inhibition performance. The content of the phenolic resin was set to 1 wt % with respect to the total weight of the core part, the coating was performed by wet coating, and carbonization was performed after the coating, thereby manufacturing an anode active material. An anode and a lithium secondary half cell were manufactured using the anode active material in the same manner as those of Examples.

The evaluation results of the electrochemical properties are shown in Table 5, and the results are obtained by measuring the capacity retention rate after 50 cycles at each C-rate.

The D50 and the specific surface area are shown in Table 6.

TABLE 5

| Anode material | Coating material | wt % | 0.5C | 1C | 3C | 5C |
|---|---|---|---|---|---|---|
| Earth graphite:pitch coke = 30:70 | Phenolic resin | 1 | 100 | 99.6 | 98.5 | 97.5 |
| Earth graphite:pitch coke = 70:30 | Phenolic resin | 1 | 100 | 99.9 | 97.8 | 96.4 |
| Flake graphite:pitch coke = 30:70 | Phenolic resin | 1 | 99 | 99.5 | 97.4 | 92.4 |
| Flake graphite:pitch coke = 70:30 | Phenolic resin | 1 | 100 | 99.6 | 96.2 | 91.5 |

TABLE 6

| Anode material | Coating material | wt % | D50 (um) | Specific surface area (m²/g) |
|---|---|---|---|---|
| Earth graphite:pitch coke = 20:80 | Phenolic resin | 1 | 8.8 | 1.4 |
| Earth graphite:pitch coke = 30:70 | Phenolic resin | 1 | 8.3 | 1.1 |
| Earth graphite:pitch coke = 70:30 | Phenolic resin | 1 | 6.0 | 1.2 |
| Earth graphite:pitch coke = 80:20 | Phenolic resin | 1 | 5.7 | 1.0 |

TABLE 6-continued

| Anode material | Coating material | wt % | D50 (um) | Specific surface area (m²/g) |
|---|---|---|---|---|
| Flake graphite:pitch coke = 20:80 | Phenolic resin | 1 | 8.4 | 1.5 |
| Flake graphite:pitch coke = 30:70 | Phenolic resin | 1 | 8.1 | 1.3 |
| Flake graphite:pitch coke = 70:30 | Phenolic resin | 1 | 5.8 | 1.1 |
| Flake graphite:pitch coke = 80:20 | Phenolic resin | 1 | 8.8 | 1.4 |

It could be confirmed that in the case of using earth graphite, the capacity retention rate was maintained even at a 5C-rate in comparison to the case of using flake graphite.

Figure 2:
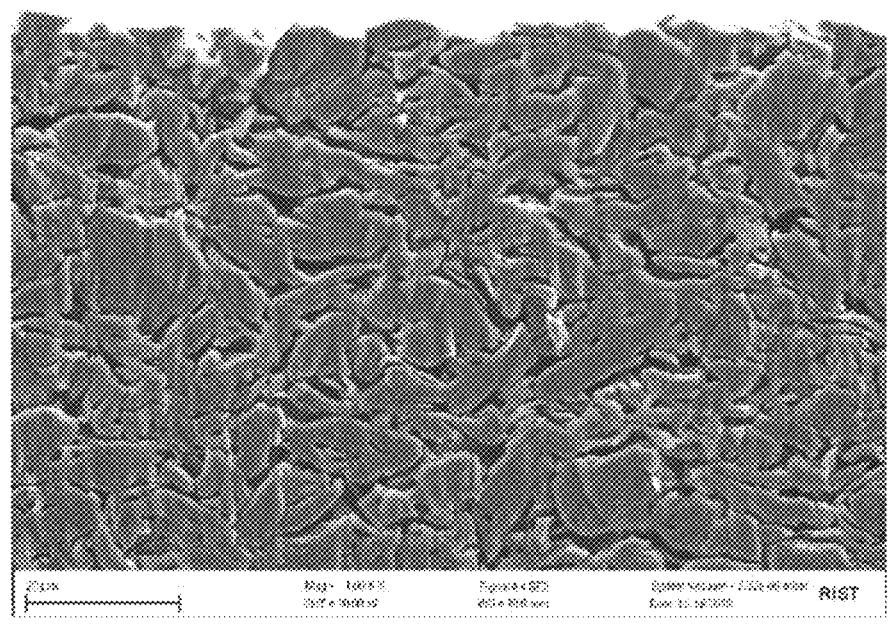
FIG. 2 illustrates an anode piece of an exemplary embodiment of the present disclosure.
Figure 3:
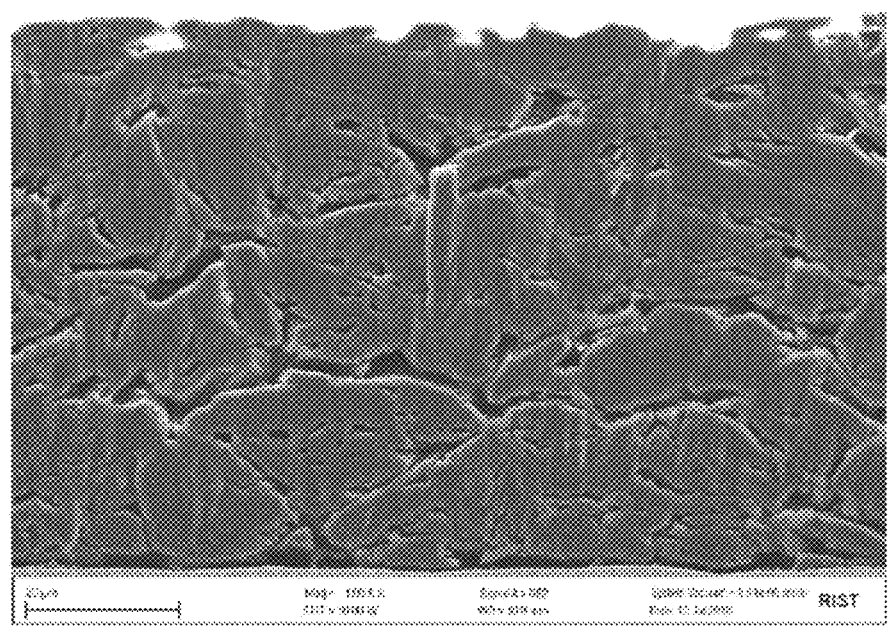
FIG. 3 illustrates an anode piece of a comparative example of the present disclosure.

In addition, views obtained by capturing images of an electrode piece after 50 cycles at a 5C-rate in a case where a ratio of earth graphite:pitch coke is 30:70 (FIG. 2) and in a case where a ratio of flake graphite:pitch coke is 30:70 (FIG. 3) with a scanning electron microscope (SEM) are illustrated in FIGS. 2 and 3. The electrode piece was cut using a focused ion beam.

The electrode was manufactured by setting all thicknesses of the active materials on the initial electrode (copper plate), and it could be confirmed that in the case of using flake graphite, the anode active material was expanded by about 20% or more after 50 cycles in comparison to the case of using flake graphite.

The present invention is not limited to the exemplary embodiments, but may be manufactured in various different forms, and it will be apparent to those skilled in the art to which the present invention pertains that various modifications and alterations may be made without departing from the spirit or essential feature of the present invention. Therefore, it is to be understood that the exemplary embodiments described hereinabove are illustrative rather than being restrictive in all aspects.

The invention claimed is:

1. An anode active material for a lithium secondary battery, comprising:
   a core part in which earth graphite and coal-based calcined pitch coke are mixed with each other; and
   a hard carbon coating for coating the core part,
   wherein a mixing ratio of the earth graphite to the coal-based calcined pitch coke is 30:70 to 70:30.

2. The anode active material for a lithium secondary battery of claim 1, wherein:
   a thickness of the hard carbon coating part is 10 to 700 nm.

3. The anode active material for a lithium secondary battery of claim 1, wherein:
   a degree of graphitization of the earth graphite is 90% or more.

4. The anode active material for a lithium secondary battery of claim 1, wherein:
   the anode active material for a lithium secondary battery exhibits a volume expansion rate of less than 20% after 50 cycles at a 5C-rate.

5. The anode active material for a lithium secondary battery of claim 1, wherein:
   the earth graphite has a crystallite size La of 20 to 50 nm and a crystallite size Lc of 10 to 40 nm, when measured by X-ray diffraction (XRD).

6. The anode active material for a lithium secondary battery of claim 1, wherein:

an average particle size D50 of the anode active material for a lithium secondary battery is 14 to 19 μm.

7. The anode active material for a lithium secondary battery of claim 1, wherein:

the anode active material for a lithium secondary battery has a specific surface area (BET) of 0.9 to 1.3 $m^2/g$.

8. The anode active material for a lithium secondary battery of claim 1, wherein:

the hard carbon results from carbonization of a source that is one or more selected from the group consisting of a phenolic resin, a naphthalene resin, a furfuryl alcohol resin, a polyamide resin, a furan resin, a polyimide resin, an epoxy resin, a vinyl chloride resin, gum arabic, citric acid, stearic acid, sucrose, polyvinylidene fluoride, carboxymethyl cellulose (CMC), hydroxypropyl cellulose, regenerated cellulose, polyvinylpyrrolidone, tetrafluoroethylene, polyethylene, polypropylene, an ethylene propylene diene monomer (EPDM), a sulfonated EPDM, starch, polyacrylic acid, sodium polyacrylate, polyacrylonitrile, cellulose, styrene, polyvinyl alcohol, and polyvinyl chloride.

\* \* \* \* \*